US00RE40518E

(19) United States
(12) Reissued Patent
Lee et al.

(10) Patent Number: US RE40,518 E
(45) Date of Reissued Patent: Sep. 23, 2008

(54) CHANNEL ASSIGNMENT METHOD FOR A BASE STATION IN A MOBILE COMMUNICATION SYSTEM

(75) Inventors: Hyun-Seok Lee, Seoul (KR); Yong Chang, Kyonggi-do (KR)

(73) Assignee: Samsung Electronics Co., Ltd (KR)

(21) Appl. No.: 10/985,829

(22) Filed: Nov. 10, 2004

Related U.S. Patent Documents

Reissue of:
(64) Patent No.: 6,490,453
Issued: Dec. 3, 2002
Appl. No.: 09/569,932
Filed: May 12, 2000

U.S. Applications:
(60) Provisional application No. 60/133,790, filed on May 12, 1999.

(51) Int. Cl.
*H04K 1/00* (2006.01)

(52) U.S. Cl. ..... 455/450; 455/447; 455/455; 370/209; 370/329; 370/335; 375/137

(58) Field of Classification Search ..... 370/209, 370/329, 335; 375/137, 141; 455/450, 447, 455/455
See application file for complete search history.

(56) References Cited

U.S. PATENT DOCUMENTS 5,884,187 A 3/1999 Ziv et al.
6,314,125 B1 * 11/2001 Shanbhag ..... 375/130

FOREIGN PATENT DOCUMENTS

| | | |
|---|---|---|
| WO | WO 99/07174 | 2/1999 |
| WO | WO 99/13599 | 3/1999 |
| WO | WO 99/14975 | 3/1999 |

OTHER PUBLICATIONS

"Mobile Station–Base Station Compatibility Standard for Wideband Spread Spectrum Cellular Systems", TIA/EIA Standard, Mar. 1999.

* cited by examiner

*Primary Examiner*—Matthew D. Anderson
*Assistant Examiner*—Yuwen Pan
(74) *Attorney, Agent, or Firm*—The Farrell Law Firm, PC

(57) ABSTRACT

There is disclosed a method for performing channel assignment in a base station for a mobile communication system. Upon receipt of a request for assigning a channel to a mobile station, a base station transceiver system (BTS) generates a connect message including channel information, which indicates a Walsh code, out of 256 Walsh codes, to be used for a channel to be assigned to the mobile station, and a quasi-orthogonal function (QOF) index. The BTS transmits the generated connect message to a base station controller (BSC). The BSC generates a connect ACK message for acknowledging the channel assignment-related information included in the connect message and transmits the generated connect ACK message to the BTS. Upon receipt of the connect ACK message, in the BTS assigns the channel that was acknowledged by the BSC to the mobile station.

18 Claims, 12 Drawing Sheets

| 7 | 6 | 5 | 4 | 3 | 2 | 1 | 0 | OCTET |
|---|---|---|---|---|---|---|---|---|
| MESSAGE TYPE II = [01H] | | | | | | | | |
| CALL CONNECTION REFERENCE: AI ELEMENT IDENTIFIER = [3FH] | | | | | | | | 1 |
| LENGTH = [08H] | | | | | | | | 2 |
| (MSB) | MARKET ID = <ANY VALUE> | | | | | | | 3 |
| | | | | | | | (LSB) | 4 |
| (MSB) | GENERATING ENTITY ID = <ANY VALUE> | | | | | | | 5 |
| | | | | | | | (LSB) | 6 |
| (MSB) | | | | | | | | 7 |
| CALL CONNECTION REFERENCE = <ANY VALUE> | | | | | | | | 8 |
| | | | | | | | | 9 |
| | | | | | | | (LSB) | 10 |
| CORRELATION ID: A3/A7 ELEMENT IDENTIFIER = [13H] | | | | | | | | 1 |
| LENGTH = [04H] | | | | | | | | 2 |
| (MSB) | | | | | | | | 3 |
| CORRELATION VALUE = <ANY VALUE> | | | | | | | | 4 |
| | | | | | | | | 5 |
| | | | | | | | (LSB) | 6 |
| SDU ID: A3/A7 ELEMENT IDENTIFIER = [4CH] | | | | | | | | 1 |
| LENGTH = <VARIABLE> | | | | | | | | 2 |
| (MSB) | SDU ID = <ANY VALUE> | | | | | | | 3 |
| | | | | | | | | |
| | | | | | | | (LSB) | n |

FIG. 5A

| | | | |
|---|---|---|---|
| A3 CONNECT INFORMATION{1+: A3/A7 ELEMENT = [1BH] | | | 1 |
| LENGTH = <VARIABLE> | | | 2 |
| RESERVED = [0] | FRAME SELECTOR INDEX = [000 000 111 111] | NEW A3 INDICATOR = [0,1] (EXIST,NEW) | 3 |
| LENGTH OF CELL INFO RECORD = (VARIABLE) | | | 4 |
| CELL INFO RECORD {1+: | | | |
| CELL IDENTIFICATION DISCRIMINATOR =[02H,07H,08H] | | | j |
| IF (DISCRIMINATOR = 02H), CELL IDENTIFICATION {1: | | | |
| (MSB) | CELL = [001H–FFFH] | | j+1 |
| | (LSB) | SECTOR =[0H–FH] (0H =OMNI) | j+2 |
| } OR IF (DISCRIMINATOR = 07H), CELL IDENTIFICATION {1: | | | |
| (MSB) | | | j+1 |
| MSCID = <ANY VALUE> | | | j+2 |
| | | (LSB) | j+3 |
| (MSB) | CELL =[001H–FFFH] | | j+4 |
| | (LSB) | SECTOR = [0H–FH] (0H = OMNI) | j+5 |
| } OR IF (DISCRIMINATOR = 08H), CELL IDENTIFICATION {1: | | | |
| MCC DIGIT 2 = [0H–FH] | MCC DIGIT 1 = [0H–FH] | | j+1 |
| MNC DIGIT 3 = [0H–FH] | MCC DIGIT 3 = [0H–FH] | | j+2 |
| MNC DIGIT 2 = [0H–FH] | MNC DIGIT 1 = [0H–FH] | | j+3 |

FIG. 5B

| | | | | |
|---|---|---|---|---|
| (MSB) | LAC = [0001H–FFFFH] | | | j+4 |
| | | | (LSB) | j+5 |
| (MSB) | CWLL = [001H–FFFH] | | | j+6 |
| | (LSB) | SECTOR = [0H–FH] (0H = OMNI) | | j+7 |
| } CELL IDENTIFICATION | | | | |
| RESERVED=[00000] | NEW CELL INDICATOR = [0,1] (OLD, NEW) | PWR_COMB_IND = [0,1] (NO,YES) | (MSB) | K |
| PILOT_PN =<ANY VALUE> | | | (LSB) | k+1 |
| CODE CHANNEL = [00H–3FH] | | | | k+2 |
| } CELL INFO RECORD | | | | |
| LENGTH OF TRAFFIC CIRCUIT ID = <VARIABLE> | | | | 1 |
| TRAFFIC CIRCUIT {1: | | | | |
| LENGTH OF TRAFFIC CIRCUIT IDENTIFIER = <VARIABLE> | | | | 2 |
| (MSB) | TRAFFIC CIRCUIT IDENTIFIER = <ANY VALUE> | | | 3 |
| | | | | |
| | | | (LSB) | n |
| LENGTH OF TRAFFIC CONNECTION IDENTIFIER = [01H] | | | | n+1 |
| TRAFFIC CONNECTION IDENTIFIER = [00H–FFH] | | | | n+2 |
| } TRAFFIC CIRCUIT ID | | | | |

FIG. 5C

| | | |
|---|---|---|
| EXTENDED HANDOFF DIRECTION PARAMETERS FIELD LENGTH = [09H] | | p |
| EXTENDED HANDOFF DIRECTION PARAMETERS {1+: | | |
| SEARCH WINDOW A SIZE (SRCH_WIN_A) = | SEARCH WINDOW N SIZE (SRCH_WIN_N) = | p+1 |
| SEARCH WINDOW R SIZE (SRCH_WIN_R) = | ADD PILOT THRESHOLD (T_ADD) HIGH ORDER | p+2 |
| T_ADD (LOW ORDER) | DROP POLOT THRESHOLD (T_DROP) = [000000-111111] | p+3 |
| COMPARE THRESHOLD (T_COMP) | DROP TIMER VALUW (T_TDROP) | p+4 |
| NEIGHBOR MAX AGE (NGHBOR_MAX_AGE) | RESERVED = [0000] | p+5 |
| RESERVED = [00] | SOFT_SLOPE = [00 0000 – 11 1111] | p+6 |
| RESERVED = [00] | ADD_INTERCEPT = [00 0000 – 11 1111] | p+7 |
| RESERVED = [00] | DROP_INTERCEPT = [00 0000 – 11 1111] | p+8 |
| TARGET BS P_REV = [00H FFH] | | p+9 |
| } EXTENDED HANDOFF DIRECTION PARAMETERS | | |
| LENGTH OF CHANNEL ELEMENT ID = <VARIABLE> | | q |
| (MSB) | CHANNEL ELEMENT ID = <ANY VALUE> | q+1 |
| | | |
| | (LSB) | r |
| }A3 CONNECT INFORMATION | | |

FIG. 5D

| 7 | 6 | 5 | 4 | 3 | 2 | 1 | 0 | OCTET |
|---|---|---|---|---|---|---|---|---|
| MESSAGE TYPE 11 = [02H] | | | | | | | | 1 |
| CALL CONNECTION REFERENCE: AL ELEMENT IDENTIFIER = [3FH] | | | | | | | | 1 |
| LENGTH = [08H] | | | | | | | | 2 |
| (MSB) | MARKET ID = <ANY VALUE> | | | | | | | 3 |
| | | | | | | | (LSB) | 4 |
| (MSB) | | GENERATING ENTITY ID = <ANY VALUE> | | | | | | 5 |
| | | | | | | | (LSB) | 6 |
| (MSB) | | | | | | | | 7 |
| CALL CONNECTION REFERENCE = <ANY VALUE> | | | | | | | | 8 |
| | | | | | | | | 9 |
| | | | | | | | (LSB) | 10 |
| CORRELATION ID: A3/A7 ELEMENT IDENTIFIER = [13H] | | | | | | | | 1 |
| LENGTH = [04H] | | | | | | | | 2 |
| (MSB) | | | | | | | | 3 |
| CORRELATION VALUE = <ANY VALUE> | | | | | | | | 4 |
| | | | | | | | | 5 |
| | | | | | | | (LSB) | 6 |

FIG. 6A

| | | | | |
|---|---|---|---|---|
| A3 CONNECT ACK INFORMATION{1+: A3/A7 ELEMENT IDENTIFIER={1CH} | | | | 1 |
| LENGTH = <VARIABLE> | | | | 2 |
| RESERVED = [00] | SOFT HANDOFF LEG # = [0000 TO 1111] | PMC CAUSE PRESENT = [1] (YES) | XMIT NOTIFY (SEND A3-TCH STATUS) = [0,1] (NO, YES) | 3 |
| LENGTH OF TRAFFIC CIRCUIT ID = [05H] | | | | 4 |
| TRAFFIC CIRCUIT ID {1: | | | | |
| LENGTH OF TRAFFIC CIRCUIT IDENTIFIER = [02H] | | | | 5 |
| (MSB) | TRAFFIC CIRCUIT IDENTIFIER = <ANY VALUE> | | | 6 |
| | | | | |
| | | | (LSB) | 7 |
| LENGTH OF TRAFFIC CONNECTION IDENTIFIER = [01] | | | | 8 |
| TRAFFIC CONNECTION IDENTIFIER = [00H-FFH] | | | | 9 |
| } TRAFFIC CIRCUIT ID | | | | |
| LENGTH OF CHANNEL ELEMENT ID = <VARIABLE> | | | | J |
| (MSB) | CHANNEL ELEMENT ID = <ANY VALUE> | | | J+1 |
| | | | | |
| | | | (LSB) | K |
| PMC CAUSE = | | | | K+1 |
| RESERVED = [00] | FRAME SELECTOR INDEX = | | | K+2 |
| } A3 CONNECT ACK INFORMATION | | | | |

FIG. 6B

CHANNEL ASSIGNMENT METHOD FOR A BASE STATION IN A MOBILE COMMUNICATION SYSTEM

Matter enclosed in heavy brackets [ ] appears in the original patent but forms no part of this reissue specification; matter printed in italics indicates the additions made by reissue.

This application claims the benefit of Provisional Application No. 60/133,790, filed May 12, 1999.

BACKGROUND OF THE INVENTION

1. Field of the Invention

The present invention relates generally to a CDMA (Code Division Multiple Access) mobile communication system, and in particular, to a method for providing 4 quasi-orthogonal functions (QOF), which are used in association with 256 Walsh codes in a forward link, in a base station transceiver system (BTS) and a base station controller (BSC).

2. Description of the Related Art

Existing IS-95A/B CDMA communication systems spread a radio channel with a Walsh function. However, as the IS-2000 standard introduces new channels to the forward and reverse links, the existing conventional communication system lacks the necessary amount of Walsh codes to maintain orthogonality between channels.

Accordingly, there is a need for a method for increasing the number of the channels, without decreasing the orthogonality between the existing channels. For the IS-2000 forward link, several methods have been proposed. One method is to define a quasi-orthogonal function (QOF) necessary for the mobile station thereby to assign 4 times the channels as compared with the case when the existing Walsh function is used, and another method is to expand the existing Walsh function which can generate 64 Walsh codes, so as to generate 256 Walsh codes. The quasi-orthogonal function (QOF) is commonly applied to IS-2000 forward channels, such as the fundamental channel (FCH), the dedicated control channel (DCCH) and the supplemental channel (SCH). However, existing base stations can only support 64 Walsh code channels.

Now, reference will be made to the types of the channels used in the IMT-2000 (International Mobile Telecommunications 2000) standard. IMT-2000 includes UMTS (Universal Mobile Telecommunication Service) and CDMA-2000/IS-2000.

Every channel is divided into a physical channel and a logical channel. The logical channel is established over the physical channel, and several logical channels can be established on a single physical channel. If the physical channel is released, the logical channel established over the physical channel is automatically released. It is not necessary to establish another physical channel in order to establish a certain logical channel. When a physical channel to be established for a logical channel is already established for another logical channel, the only required operation is to assign this logical channel to the previously established physical channel.

The physical channel can be divided into dedicated channels and common channels according to its characteristics. Dedicated channels are exclusively used for communication between the BTS and a particular mobile station (MS), and include a fundamental channel (FCH), a dedicated control channel (DCCH) and a supplemental channel (SCH). The fundamental channel is used to transmit voice, data and signaling signals. Such a fundamental channel is compatible with TIA/EIA-95-B. The dedicated control channel is used to transmit data and signaling signals. The dedicated control channel supports a discontinuous transmission (DTX) mode in which data is only transmitted when the upper layer generates transmission data. Because of this property, the dedicated control channel is suitable for effectively providing a packet service. The supplemental channel is used to transmit large amounts of data.

In addition to the dedicated channels stated above, the physical channel includes a common channel which is used in common by the base station and several mobile stations. A physical channel for the forward link transmitted from the BTS to the MS is called a paging channel, and a physical channel for the reverse link transmitted from the MS to the BTS is called an access channel. These common channels are compatible with IS-95B.

The logical channels to be assigned on the above physical channels include a dedicated signaling channel (dsch) and a dedicated traffic channel (dtch). The dedicated signaling channel can be assigned to the fundamental channel and the dedicated control channel, which are physical channels. The dedicated traffic channel can be assigned to the fundamental channel, the dedicated control channel and the supplemental channel. The dedicated signaling channel is used when the base station and the mobile station exchange a control signal. The dedicated traffic channel is used when the base station and the mobile station exchange user data.

The common logical channel to be assigned on the common physical channel is divided into a common signaling channel (csch) used to transmit control signal, and a common traffic channel (ctch) use to transmit user data. The common logical channels are assigned on the paging channel for the forward link, and are assigned on the access channel for the reverse link.

FIG. 1 shows a structure of a general mobile communication system. More specifically, FIG. 1 shows a reference model of a 3G IOS (Interoperability Specifications) for a digital air interface between a mobile switching center (MSC) and a base station, and between base stations in the common mobile communication system.

Referring to FIG. 1, between MSC 20 and BSC 32, a signal is defined as an A1 interface and user information is defined as an A2/A5 (circuit data) interface. An A3 interface is defined to connect a target BS 40 to a frame selection/distribution unit (SDU) function block 34 of a source BS 30 for soft/softer handoff between base stations. The signaling and user traffic between the target BS 40 and the SDU function block 34 of the source BS 30 are transmitted through the A3 interface. An A7 interface is defined for signal exchange between the target BS 40 and the source BS 30, for soft/softer handoff between the base stations. In the CDMA mobile communication system, a wired communication link between the base station 30 and the base station 40, and between the base station 30 and the MSC 20, is comprised of a forward link transmitted from the MSC 20 to the base station 30, a reverse link transmitted from the base station 30 to the MSC 20. Generally, a wired bi-directional line connected between the MSC 20 and the base station 30 carries the forward and reverse links. The MSC 20 includes a call control and mobility management block 22 and a switching block 24. Further, the MSC 20 is connected to a data network such as the Internet through an interworking function (IWF) block 50. The wired line exists over all the interfaces in the RAN, e.g., MSC-BSC, BS-BS, BSC-BTS, BSC-Target BTS and so on.

FIG. 2 shows a procedure for exchanging signals between the BTS and the BSC (more specifically, the SDU function block in the BSC, BSC-SDU) according to the prior art. The operation can be performed either between the BSC 32 (or BSC-SDU 34) and the BTS 36 in the source BS 30, or between the BSC 42 and the BTS 44 in the target BS 40. FIG. 2 is independent of types of the required physical channel, i.e., DCCH, FCH, SCH or whatever. That is, the invention in this document can be applied to all types of physical channels.

Referring to FIG. 2, the BTS determines forward and reverse channels to be established with the MS and then generates a signaling message (more specifically, a connect message) necessary for channel establishment, in step 201. The generated signaling message includes a frame selector (or channel type) and channel information. The detailed operation of step 201 will be described later with reference to FIG. 3. The BTS sends the generated connect message to the BSC in step 203. Upon receipt of the connect message, the BSC analyzes the received connect message to check the channel assigned to the MS, and generates a connect ACK message to be transmitted to the BTS, in step 205. The detailed operation of receiving the connect message will be described later with reference to FIG. 4. The BSC sends the generated connect ACK message to the BTS in step 207. The connect ACK message includes information for acknowledging establishment of the channel requested by the BTS. The BTS then assigns the acknowledged channel to the MS in step 209.

Summarizing the operation of FIG. 2, the BTS generates the connect message including information about a channel to be assigned to the MS and sends the generated connect message to the BSC. Upon receipt of the connect message, the BSC processes the received connect message, generates the connect ACK message for acknowledging channel assignment and sends the generated connect ACK message to the BTS. The BTS then assigns the acknowledged channel to the MS.

FIG. 3 shows a detailed procedure for transmitting the connect message according to the prior art. This operation is performed when the BTS transmits the connect message to the BSC-SDU when it is required to assign a channel to the MS. The structures of the connect message transmitted from the BTS to the BSC-SDU are shown in FIGS. 5A and 5B.

Referring to FIG. 3, the BTS determines in step 301 whether the channel to be assigned to the MS is a supplemental code channel (SCCH). SCCH is the IS-2000 defined name corresponding to IS-95B SCH (Supplemental Channel). IS-2000 is on the evolution path of IS-95A/B. IS-2000 also has the IS-95 A/B channels in order to maintain backward compatibility. It is determined in step 301 that the channel to be assigned to the MS is SCCH, the BTS sets (designates) in step 303 the frame selector (or channel type) in the connect message, whose structure is shown in FIGS. 5A and 5B, to IS-95B SCCH, so as to enable the BSC to recognize that the channel to be assigned is an IS-95B channel, and then designates a Walsh code with 6-bit channel information. Thereafter, in step 305, the BTS ignores an information element overlapped due to establishment of the IS-95A/B fundamental channel in the connect message, whose structure is shown in FIGS. 5A and 5B. Cell Information, Extended Handoff Parameters in the A3 Connect Information element are overlapped with those in the same Connect message used when IS-95 A/B FCH is newly established. IS-95B SCCH establishment procedure follows the IS-95 A/B FCH establishment procedure. IS-95B SCCH has to be established in parallel to IS-95A/B FCH under the same cell. The BTS fills all other information elements to complete the connect message, and then transmits the connect message to the BSC. Here, in a handoff (HO) situation, the BTS fills all the handoff-related information element.

If it is determined in step 301 that the channel to be assigned to the MS is not SCCH, the BTS designates in step 307 the frame selector (or channel type) in the connect message shown in FIGS. 5A and 5B to the fundamental channel, so as to enable the BSC to recognize that the channel to be assigned is an IS-95B fundamental channel, and then designates a Walsh code with 6-bit channel information. Thereafter, in step 309, the BTS fills all the information elements in the connect message of FIGS. 5A and 5B to complete the connect message, and then transmits the connect message to the BSC. Here, in the handoff (HO) situation, the BTS fills all the handoff-related information element.

FIG. 4 shows a procedure for receiving the connect message according to the prior art. This operation is performed when the BSC-SDU receives the connect message for requesting channel assignment, transmitted from the BTS, and generates a connect ACK message for the connect message.

Referring to FIG. 4, the BSC-SDU receives the connect message for requesting channel assignment from the BTS in step 401. In step 401, the BSC-SDU analyzes the received connect message, and examines the establishment-requested channel in the message of FIGS. 5A and 5B and an identifier of a traffic channel between the BTS and BSC. The BSC-SDU assigns the traffic channel between the BSC and BTS, corresponding to the radio channel, in step 403. As a result, channel connection among BSC-BTS-MS is completed. Further, in step 405, the BTS-SDU fills all the information elements of the connect ACK message shown in FIG. 6 and transmits it to the BTS.

A simplified structure of the connect ACK message shown in FIG. 6 will be described with reference to Table 1 below.

TABLE 1

| Information Element | Element Direction | Type |
|---|---|---|
| Message Type II | BTS > SDU | M |
| Call Connection Reference | BTS > SDU | 0 |
| Correlation ID | BTS > SDU | 0 |
| SDU ID | BTS > SDU | 0 |
| A3 Connect Information | BTS > SDU | 0 |

M: Mandatory,
O: Optional,
R: Recommend,
C: Conditionally Recommend

The connect message shown in Table 1 is an A3 message transmitted when the target BS 40 initiates or adds one or more A3 user traffic connections to the SDU 34 of the source BS 30. The A3 message includes the following information.

Message Type II: an information element indicating A3/A7 message type.

Call Connection Reference: an information element for uniquely defining a call connection over all zones. This value is always maintained during call connection over every handoff.

Correlation ID: an information element used to correlate a request message with a response message for the request message.

SDU ID: an information element for identifying a specific SDU instance in one SDU node.

A3 Connect Information: an information element used to add one or more cells to one new A3 connection or existing A3 connection. This information element field is shown in Table 2 below, and $4^{th}$ to (j−1)th octets of Table 2 include Cell Information Record fields of Table 3 below.

TABLE 2

| 7 | 6 | 5 | 4 | 3 | 2 | 1 | 0 | Octet |
|---|---|---|---|---|---|---|---|---|
| | | A3/A7 Element Identifier | | | | | | 1 |
| Reserved | | Framed Selector Index | | | | | New A3 Indicator | 2 |
| | | Length of Cell Info Record | | | | | | 3 |
| | | Cell Info Record-1st octet | | | | | | 4 |
| | | Cell Info Record-2nd octet | | | | | | 5 |
| | | . . . | | | | | | 6 |
| | | Cell Info Record-last octet | | | | | | . . . |
| | | Length of Traffic Circuit ID | | | | | | j |
| (MSB) | | Traffic Circuit ID | | | | | | j + 1 |
| | | . . . | | | | | | j + 2 |
| | | . . . | | | | | | . . . |
| | | | | | | | (LSB) | k |
| | | Extended Handoff Direction Parameters Field Length | | | | | | k + 1 |
| | | Extended Handoff Direction Parameters-1st cell, 1st octet | | | | | | k + 2 |
| | | . . . | | | | | | . . . |
| | | Extended Handoff Direction Parameters-1st cell, last octet | | | | | | 1 |
| | | . . . | | | | | | . . . |
| | | Extended Handoff Direction Parameters-last cell, 1st octet | | | | | | m |
| | | . . . | | | | | | . . . |
| | | Extended Handoff Direction Parameters-last cell, last octet | | | | | | n |
| | | Length of Channel Element ID | | | | | | n + 1 |
| (MSB) | | Channel Element ID-1st octet | | | | | | n + 2 |
| | | . . . | | | | | | . . . |
| | | | | | | | (LSB) | p |

TABLE 3

| 7 | 6 | 5 | 4 | 3 | 2 | 1 | 0 | Octet |
|---|---|---|---|---|---|---|---|---|
| | | A3/A7 Element Identifier | | | | | | 1 |
| | | Length | | | | | | 2 |
| | | Cell Identification Discriminator 1 | | | | | | 3 |
| | | Cell Identification | | | | | | Variable |
| | Reserved | | | New Cell Indicator | | PWR_Comb_Ind | (MSB) | j |
| | | Pilot_PN 1 | | | | | (LSB) | j + 1 |
| | | Code_Chan 1 | | | | | | j + 2 |
| | | . . . | | | | | | . . . |
| | | Cell Identification Discriminator n | | | | | | k |
| | | Cell Identification n | | | | | | Variable |
| | Reserved | | | New Cell Indicator | | PWR_Comb_Ind | (MSB) | 1 |
| | | Pilot_PN n | | | | | (LSB) | l + 1 |
| | | Code_Chan n | | | | | | 1 + 2 |

Table 3 shows a message including air interface channel information for the cells attached to one call leg, and each field is defined as follows.

Length: the number of octets of the elements following a Length field.

Cell Identification Discriminator: a value used to describe the formats following a Cell Identification field according to cells.

Cell Identification: identification of the cells relating to A3 connection.

Reserved: this value is set to '00000'.

New Cell Indicator: a field indicating whether a corresponding cell is a cell newly added to A3 traffic connection in the present procedure or a cell which previously exists in A3 connection.

PWR_Comb_Ind: a power control symbol combining indicator. The BTS sets this field to '1', if a forward traffic channel relating to the corresponding pilot transmits the same bits as closed-loop power control subchannel bits of a previous pilot in this message. Otherwise, the BTS sets this field to '0'. When this record occurs first in this element, the BTS sets this field to '0'.

Pilot_PN: this field includes a PN sequence offset corresponding to the related cell and is set in a unit of 64 PN chips.

Code_Chan: this field includes a code channel index corresponding to the related cell. The BTS sets a value used on the forward traffic channel in connection with a designated pilot to one of 0 to 63.

A simplified structure of the connect ACK message shown in FIG. 6 will be described with reference to Table 4 below.

TABLE 4

| Information Element | Element Direction | Type |
|---|---|---|
| Message Type II | SDU > BTS | M |
| Call Connection Reference | SDU > BTS | 0 |
| Correlation ID | SDU > BTS | 0 |
| A3 Connect Information | SDU > BTS | 0 |

M: Mandatory,
O: Optional,
R: Recommend,
C: Conditionally Recommend

The connect ACK message of Table 4 is an A3 message for transmitting A3-CDMA Long Code Transition Directive results performed on the A3 signaling interface from the target BS 40 to the SDU 34 of the source BS 30. Further, an A3 CDMA Long Code Transition Directive Ack message for the A3 CDMA Long Code Transition Directive of Table 4 is shown in Table 5 below.

TABLE 5

| Information Element | Element Direction | Type |
|---|---|---|
| Message Type II | BTS > SDU | M |
| Call Connection Reference | BTS > SDU | 0 |
| Cell Information Record (Committed) | BTS > SDU | 0 |
| SDU ID | BTS > SDU | 0 |
| PMC Cause | BTS > SDU | 0 |
| Cell Information Record (Uncommitted) | BTS > SDU | 0 |

M: Mandatory,
O: Optional,
R: Recommend,
C: Conditionally Recommend

The A3 CDMA Long Code Transition Directive Ack message of Table 5 includes the following information elements.

Message Type II: an information element indicating an A3/A7 message type.

Call Connection Reference: an information element for uniquely defining a call connection over all zones. This value is always maintained during call connection over every handoff.

SDU ID: an information element for identifying a specific SDU instance in one SDU node.

PMC Cause: an information element indicating failed results of A3/A7 message.

Cell Information Record (Committed, Uncommitted): a Cell Information Record field of Table 3 is used, as it is. This is an information element including air interface channel information for the cells attached to one call leg. When successful, this field is set to 'Committed', and when failed, this field is set to 'Uncommitted'. This field is used together with the PMC Cause field.

Problems of the existing channel assignment method will be described based on the foregoing descriptions.

As described with reference to Tables 1 to 5, in the conventional 3G IOS radio channel information, the quasi-orthogonal function (QOF) specified in the CDMA-2000 standard is not defined. Further, only 64 Walsh codes of 0 to 63 are supported for the code channels. Thus, when the base station does not support the quasi-orthogonal function (QOF) which is necessary for the mobile station, the 3G forward radio channel cannot be assigned in the mobile station. Therefore, it is necessary to define a message field which can support the quasi-orthogonal function (QOF) and 256 Walsh codes for the radio channel information in the existing 3G IOS.

SUMMARY OF THE INVENTION

It is, therefore, an object of the present invention to provide a method for expanding existing 64 supportable Walsh codes to 256 Walsh codes and supporting a quasi-orthogonal function (QOF) for a forward channel in a base station of a mobile communication system.

To achieve the above objects, there is provided a method for performing channel assignment in a base station for a mobile communication system. Upon receipt of a request for assigning a channel to a mobile station, a base station transceiver system (BTS) generates a connect message including channel information indicating a Walsh code to be used for a channel to be assigned to the mobile station, out of 256 Walsh codes, and information indicating a quasi-orthogonal function (QOF) index, and transmits the generated connect message to a base station controller (BSC). The BTS generates a connect ACK message for acknowledging the channel assignment-related information included in the connect message and transmits the generated connect ACK message to the BSC. Upon receipt of the connect ACK message, in the BTS assigns a channel acknowledged by the BSC to the mobile station.

BRIEF DESCRIPTION OF THE DRAWINGS

The above and other objects, features and advantages of the present invention will become more apparent from the following detailed description when taken in conjunction with the accompanying drawings in which:

FIGS. 5A through 5D are diagrams illustrating the connect message transmitted from the BTS to the BSC according to the prior art;

FIG. 6 is a diagram illustrating the connect ACK message transmitted from the BSC to the BTS according to the prior art.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In an exemplary embodiment of the invention, a base station supports a quasi-orthogonal function (QOF), defined by IS-2000, necessary for the mobile station and 256 Walsh codes, in addition to the maximum 64 code channels defined by the existing IS-95A/B.

Figure 1:
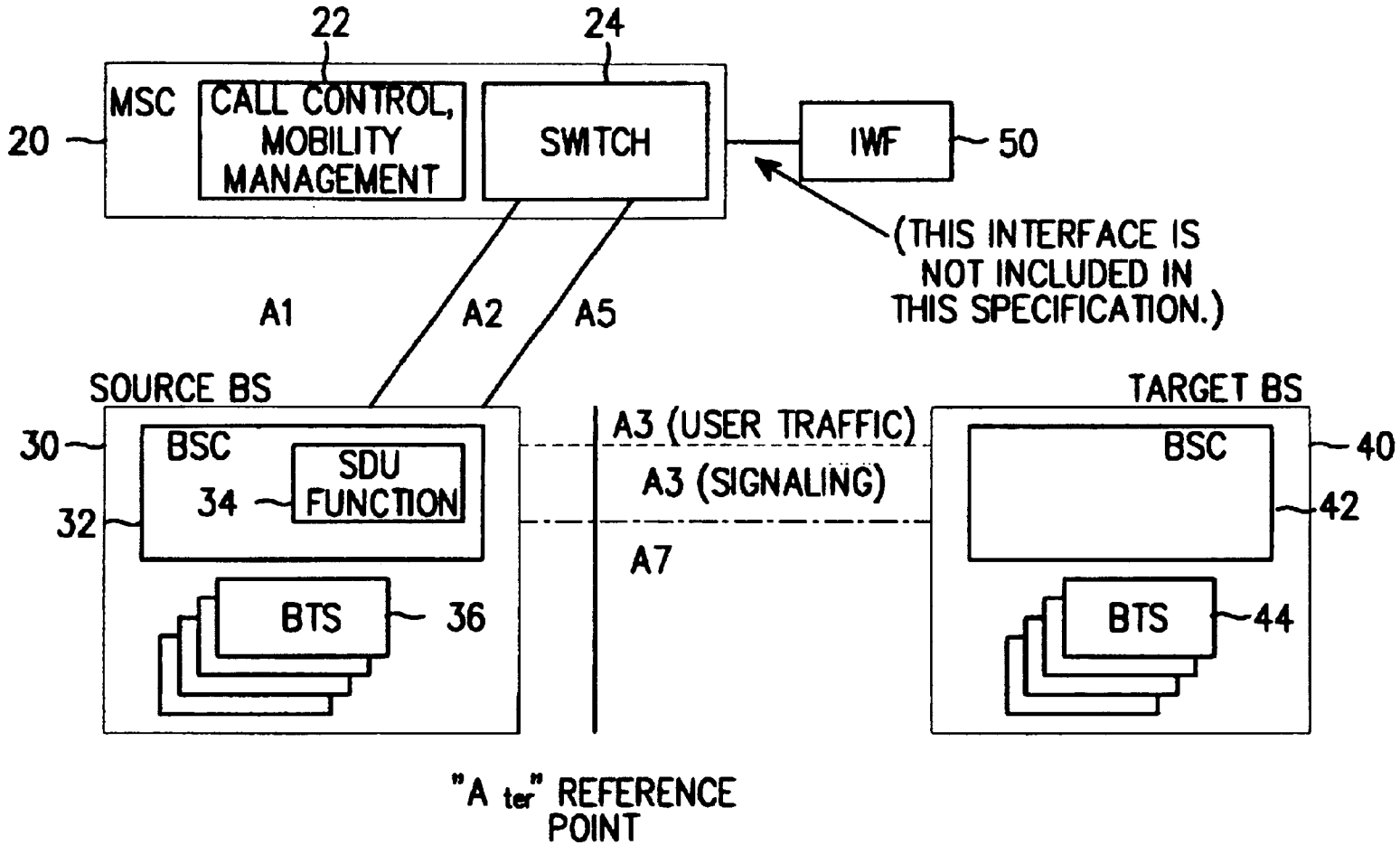
FIG. 1 is a diagram illustrating a reference model of a 3G IOS (Interoperability Specification) for a digital air interface between a mobile switching center (MSC) and a base station (BS), and between the base stations in a common mobile communication system.
Figure 2:
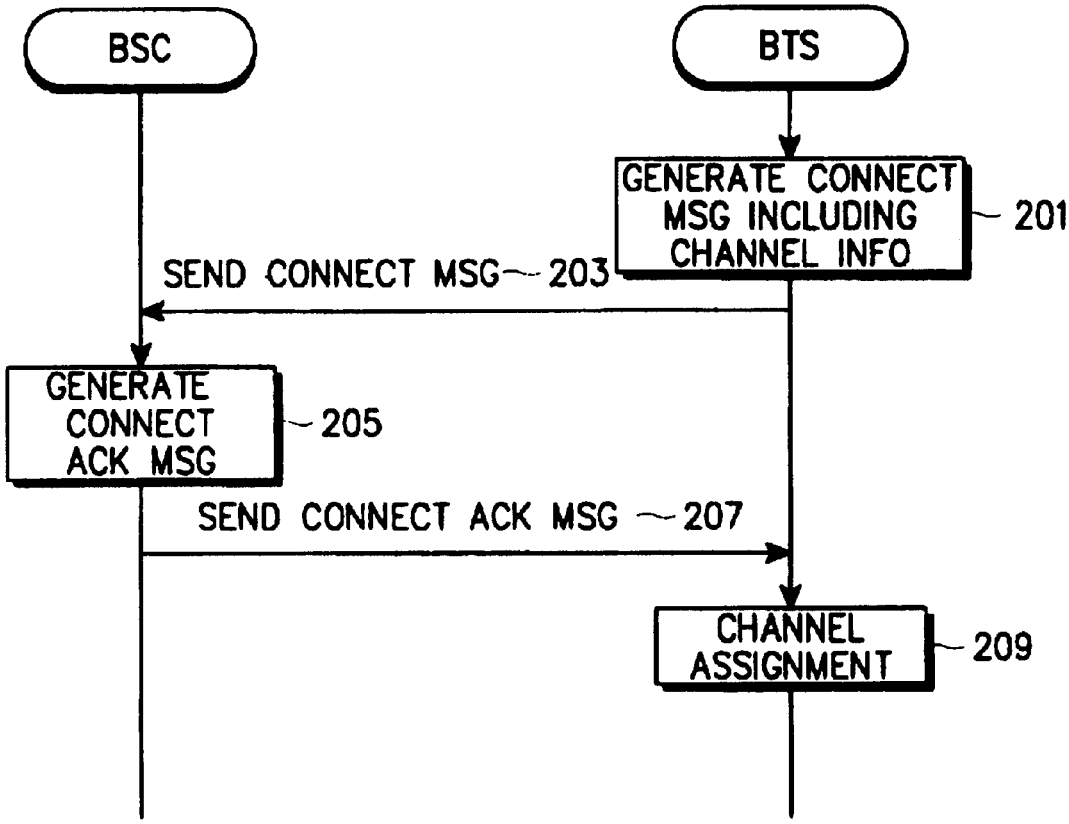
FIG. 2 is a flow diagram illustrating a procedure for exchanging signals between a base station transceiver system (BTS) and a base station controller (BSC) for radio channel assignment according to the prior art.
Figure 3:
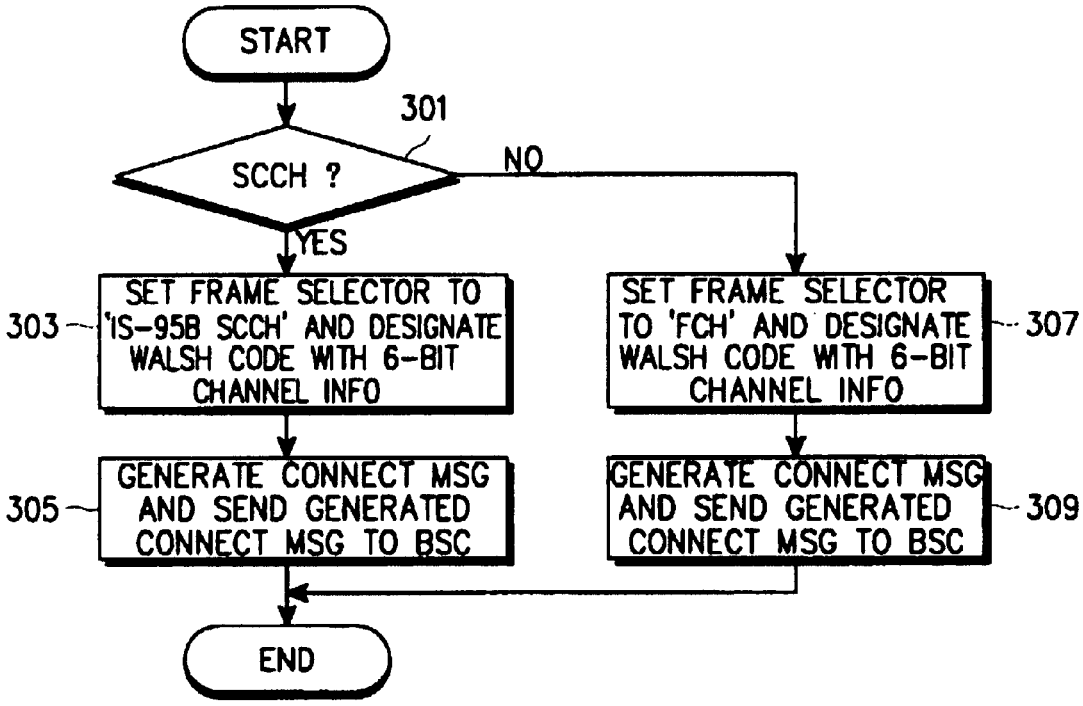
FIG. 3 is a flow chart illustrating a procedure for transmitting a connect message according to the prior art, wherein the BTS transmits the connect message to the BSC-SDU when it is necessary to assign a channel to a mobile station (MS)
Figure 4:
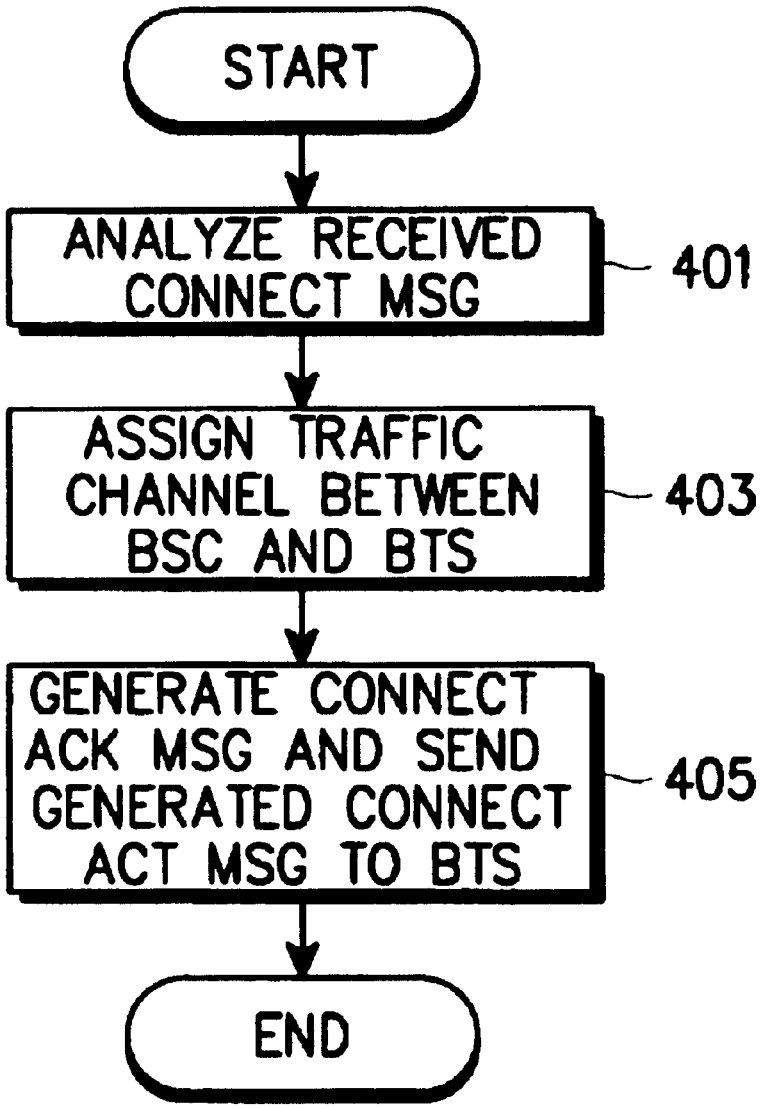
FIG. 4 is a flow chart illustrating a procedure for receiving the connect message according to the prior art, wherein the BSC-SDU receives the connect message for requesting channel assignment, transmitted from the BTS, and generates a connect ACK message for the connect message.
Figure 7A:
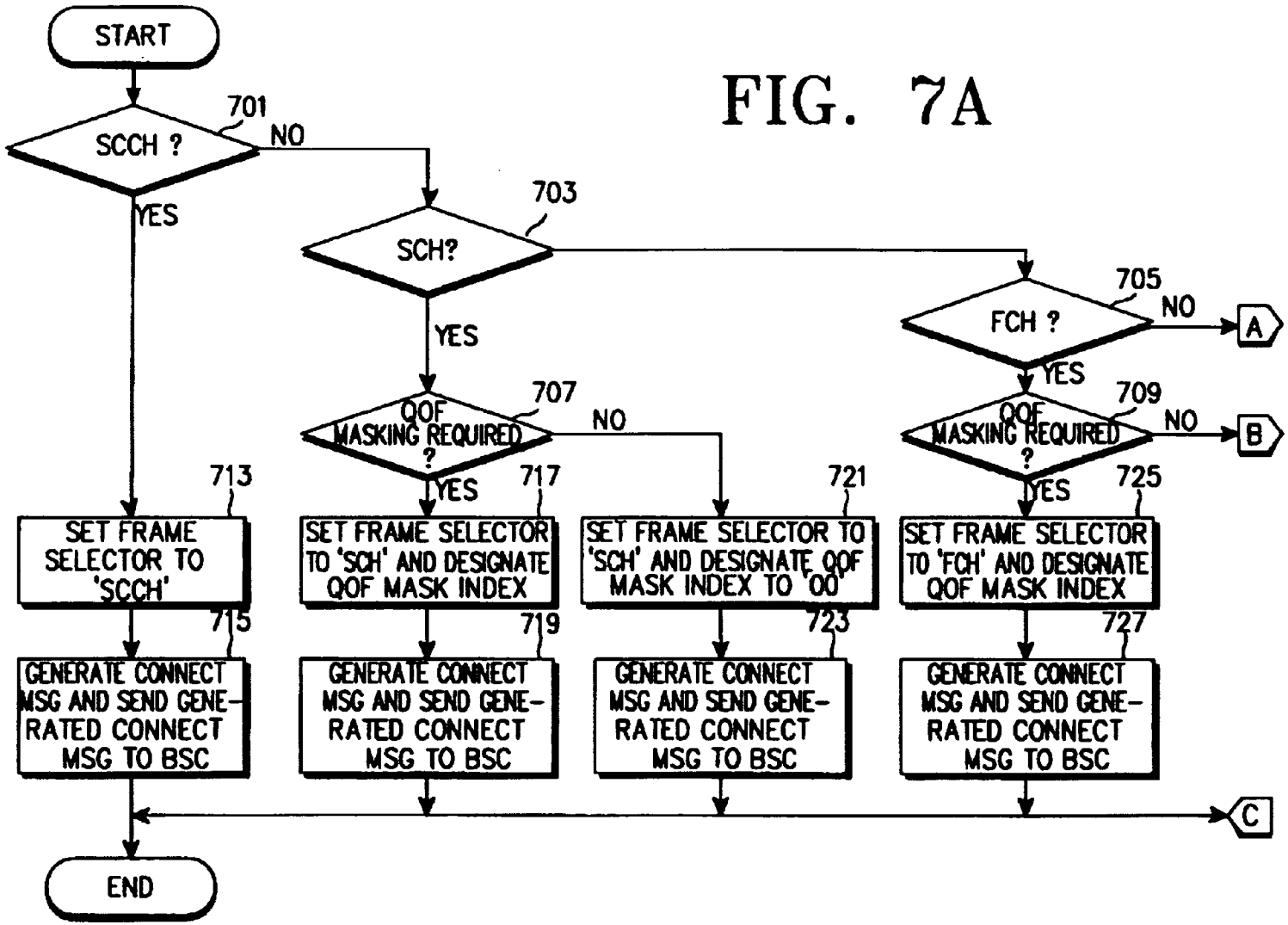
FIG. 7 is a flow chart illustrating a procedure for transmitting a connect message according to a preferred embodiment of the present invention, wherein the BTS transmits the connect message to the BSC-SDU when it is necessary to assign a channel to the MS.
Figure 7B:
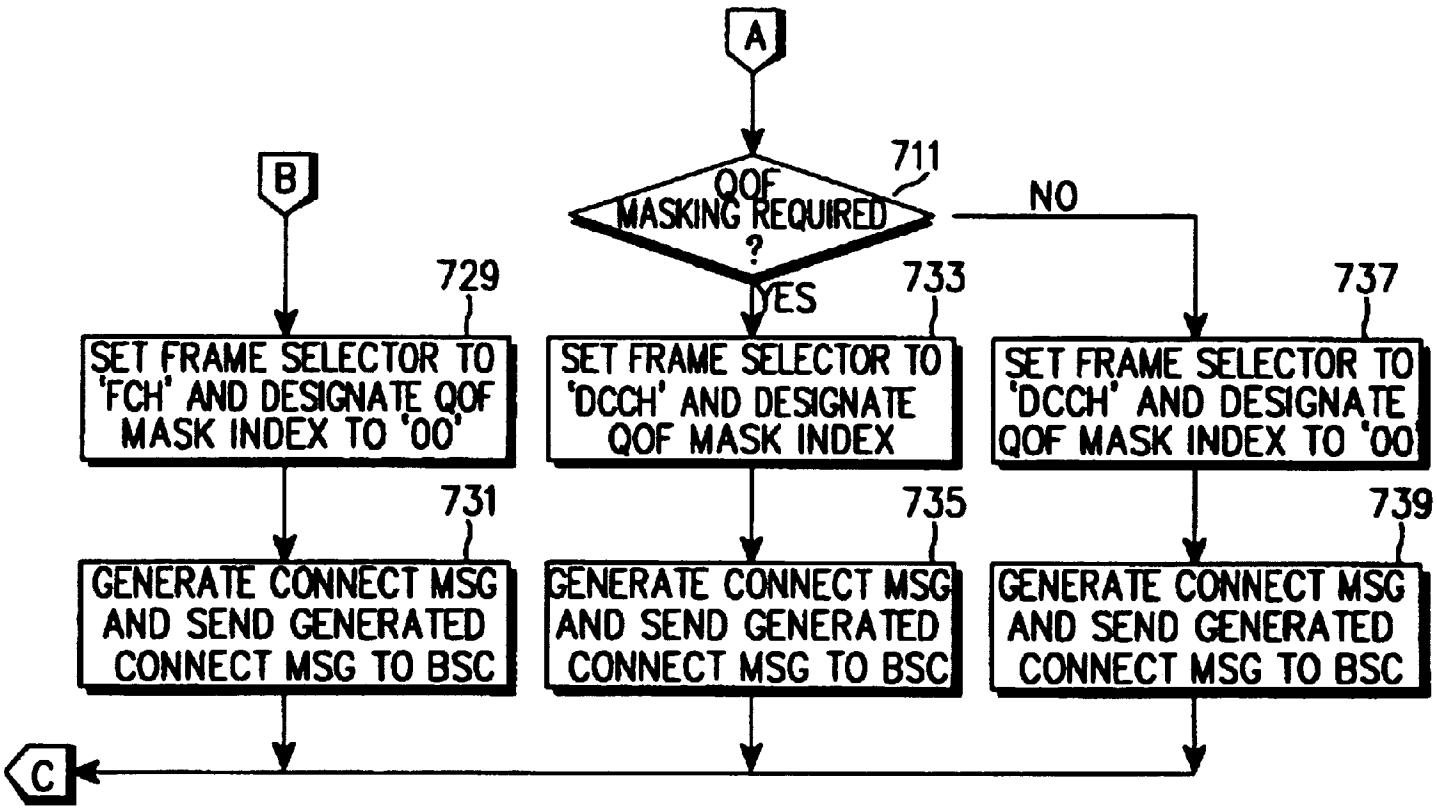

FIG. 7 shows a procedure for transmitting a connect message according to a preferred embodiment of the present invention. In this procedure, the BTS transmits the connect message to BSC-SDU when it is necessary to assign a channel to the MS. A detailed structure of the Cell Information Record included in the connect message transmitted from the BTS to the BSC-SDU will be described later with reference to FIG. 6.

Referring to FIG. 7, the BTS determines in step 701 whether a channel to be assigned to the MS is SCCH. If it is determined in step 701 that the channel to be assigned is SCCH, the BTS designates in step 713 the frame selector (or channel type) shown in FIG. 6 to 'IS-95B SCCH' so as to enable the BSC to recognize that the channel to be assigned is an IS-95B channel, and designates a Walsh code with 6-bit channel information. Then, in step 715, the BTS ignores the information elements overlapped due to establishment of IS-2000 FCH RC ½in the connect message shown in FIG. 5, fills all the remaining elements to generate (or complete) the connect message, and transmits the generated connect message to the BSC. Here, in the handoff situation, the BTS fills the handoff-related information elements to complete the connect message, and transmits the connect message to the BSC.

If it is determined to step 701 that the channel to be assigned is not SCCH, the BTS determines in step 703 whether the channel to be assigned is a supplemental channel (SCH). If it is determined in step 703 that the channel to be assigned is the supplemental channel, the BTS determines in step 707 whether to perform QOF masking on the channel to be assigned.

If it is determined in step 707 that QOF masking should be performed on the channel, the BTS designates in step 717 the frame selector (or channel type) shown in FIG. 6 to 'SCH' so as to enable the BSC to recognize that the channel to be assigned is a supplemental channel. Further, the BTS designates the channel information indicating a Walsh code to be assigned to the channel (with 8 bits or 11 bits). 8 bits can support up to 256 Walsh Codes. However, IS-2000 uses 11 bits for specifying Walsh Codes even if the present IS-2000 can only support up to 256 Walsh Codes. The remaining 3 bits are prepared for the future extension. For compliance with IS-2000, 11 bits is acceptable. But just 8 bits are sufficient for the present need. The BTS then designates a QOF mask index (=01,10,11) corresponding to the Quasi orthogonal function codes to be assigned. Then, in step 719, the BTS ignores the information elements overlapped due to the establishment of the fundamental channel (FCH) and the dedicated control channel (DCCH) in the connect message shown in FIG. 5, fills all the remaining elements to complete the connect message, and transmits the connect message to the BSC. Here, in the handoff situation, the BTS fills the handoff-related information elements of the message shown in FIG. 5 to complete the connect message, and transmits the connect message to the BSC.

If it is determined in step 707 that QOF masking should not be performed on the channel to be assigned, the BTS designates in step 721 the frame selector (or channel type) to 'SCH' so as to enable the BSC to recognize that the channel to be assigned is a supplemental channel. Further, the BTS designates the channel information indicating a Walsh code to be assigned to the channel bit number (8 bits or 11 bits) of IS-2000, and then sets the QOF mask index '00'. Here, the QOF mask index is set to '00', since QOF masking should not be performed. Then, in step 723, the BTS ignores the information elements overlapped due to establishment of the fundamental channel (FCH) and the dedicated control channel (DCCH) in the connect message shown in FIG. 5, fills all the remaining elements to complete the connect message, and transmits the connect message to the BSC. Here, in the handoff situation, the BTS fills the handoff-related information elements of the message shown in FIG. 5 to complete the connect message, and transmits the connect message to the BSC.

Meanwhile, if it is determined in step 703 that the channel to be assigned is not the supplemental channel, the BTS determines in step 705 whether the channel to be assigned is a fundamental channel (FCH). If it is determined in step 705 that the channel to be assigned is a fundamental channel, the BTS examines in step 709 whether QOF masking should be performed on the channel to be assigned.

If it is determined in step 709 that QOF masking should be performed on the channel, the BTS designates in step 725 the frame selector (or channel type) shown in FIG. 6 to 'FCH' so as to enable the BSC to recognize that the channel to be assigned is a fundamental channel. Further, the BTS designates the channel information indicating a Walsh code to be assigned to the channel bit number (8 bits or 11 bits) of IS-2000, and then designates a QOF mask index (=01, 10,11) corresponding to the Quasi orthogonal function codes to be assigned. Then, in step 727, the BTS fills all the information elements included in the connect message shown in FIG. 5 to complete the connect message, and transmits the connect message to the BSC. Here, in the handoff situation, the BTS fills the handoff-related information elements of the message shown in FIG. 5 to complete the connect message, and transmits the connect message to the BSC.

If it is determined in step 709 that QOF masking should not be performed on the channel to the assigned, the BTS designates in step 729 the frame selector (or channel type) to 'FCH' so as to enable the BSC to recognize that the channel to be assigned is a fundamental channel. Further, the BTS designates the channel information indicating a Walsh code to be assigned to the channel bit number (8 bits or 11 bits) of IS-2000 and then sets the QOF mask index to '00'. Here, the QOF mask index is set to '00', since QOF masking should not be performed. Then, in step 731, the BTS fills all the information elements included in the connect message shown in FIG. 5 to complete the connect message, and transmits the connect message to the BSC. Here, in the handoff situation, the BTS fills the handoff-related information elements of the message shown in FIG. 5 to complete the connect message, and transmits the connect message to the BSC.

However, if it is determined in step 705 that the channel to be assigned is not the fundamental channel, the BTS determines in step 711 whether QOF masking should be performed on the channel to be assigned. If it is determined in step 711 that QOF masking should be performed on the channel, the BTS designates in step 733 the frame selector (or channel type) shown in FIG. 6 to 'DCCH' so as to enable the BSC to recognize that the channel to be assigned is a dedicated control channel. Further, the BTS designates the channel information indicating a Walsh code to be assigned to the channel bit number (8 bits or 11 bits) of IS-2000, and then designates a QOF mask index (=01,10,11) corresponding to the Quasi orthogonal function codes to be assigned. Then, in step 735, the BTS fills all the information elements included in the connect message shown in FIG. 5 to complete the connect message, and transmits the connect message to the BSC. Here, in the handoff situation, the BTS fills the handoff-related information elements of the message shown in FIG. 5 to complete the connect message, and transmits the connect message to the BSC.

If it is determined in step 711 that QOF masking should not be performed on the channel to be assigned, the BTS designates in step 737 the frame selector (or channel type) to 'DCCH' so as to enable the BSC to recognize that the channel to be assigned is a dedicated control channel. Further, the BTS designates the channel information indicating a Walsh code to be assigned to the channel bit number (8 bits or 11 bits) of IS-2000, and then sets the QOF mask index to '00'. Here, the QOF mask index is set to '00', since QOF masking should not be performed. Then, in step 739, the BTS fills all the information elements included in the connect message shown in FIG. 5 to complete the connect message, and transmits the connect message to the BSC. Here, in the handoff situation, the BTS fills the handoff-related information elements of the message shown in FIG. 5 to complete the connect message, and transmits the connect message to the BSC.

Table 6 below shows the detailed structure of Cell Information Record for supporting the quasi-orthogonal function (QOF) and the 256 Walsh codes. The Cell Information Record includes a QOF MASK field for recording the QOF mask index according to the present invention and a Code_Chan field for designating 256 Walsh codes. Upon receipt of the connect message including the above fields, the BSC analyzes the channel assignment-related information recorded in the above fields, and then transmits a connect ACK message including ACK information for the connect message. Upon receipt of the connect ACK message, the BTS assigns the channel to the MS.

TABLE 6

| 7 | 6 | 5 | 4 | 3 | 2 | 1 | 0 | Octet |
|---|---|---|---|---|---|---|---|---|
| A3/A7 Element Identifier | | | | | | | | 1 |
| Length | | | | | | | | 2 |
| Cell Identification Discriminator 1 | | | | | | | | 3 |
| Cell Identification | | | | | | | | Variable |
| Reserved (3 bits) | | QOF MASK | | New Cell Indicator | | PWR_Comb_Ind | (MSB) | j |
| Pilot_PN 1 | | | | | | | (LSB) | j + 1 |
| Code_Chan 1(0-255) | | | | | | | | j + 2 |
| . . . | | | | | | | . . . | |
| Cell Identification Discriminator n | | | | | | | | k |
| Cell Identification n | | | | | | | | Variable |
| Reserved (3 bits) | | QOF MASK | | New Cell Indicator | | PWR_Comb_Ind | (MSB) | l |
| Pilot_PN 1 | | | | | | | (LSB) | l + 1 |
| Code_Chan 1(0-255) | | | | | | | | l + 2 |

As described above, the present invention provides a signaling message and a procedure for processing the signaling message such that the base station can support the quasi-orthogonal function (QOF) necessary for the mobile station. In this manner, the base station and the mobile switching center can assign 256 Walsh codes for the radio channels.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing channel assignment in a base station for a mobile communication system, comprising the steps of:

generating, in a base station transceiver system (BTS), a connect message upon receipt of a request for assigning a channel to a mobile station, said connect message including channel information indicating a Walsh code, out of 256 Walsh codes, to be used for a channel to be assigned to the mobile station, and a quasi-orthogonal function (QOF) index;

transmitting the generated connect message to a base station controller (BSC);

generating, in the BSC, a connect ACK (acknowledge) message for acknowledging channel assignment-related information included in the connect message;

transmitting the generated connect ACK message to the BTS; and assigning, in the BTS, a channel to the mobile station, said channel having been acknowledged by the BSC, upon receipt of the connect ACK message.

2. The method as claimed in claim 1, wherein four quasi-orthogonal functions are provided.

3. The method as claimed in claim 1, wherein the channel information is comprised of 8 or 11 bits.

4. The method as claimed in claim 1, wherein the step of generating the connect message comprises the steps of:

designating a frame selector (or channel type) in the connect message to indicate a supplemental code channel (SCCH) and designating a Walsh code with 6-bit channel information, if the channel to be assigned to the mobile station is a supplemental code channel (SCCH); and ignoring overlapped information elements due to establishment of a fundamental channel in the connect message and filling in the remaining information fields in the connect message.

5. The method as claimed in claim 1, wherein the step of generating the connect message comprises the steps of:

determining whether to perform QOF masking on the channel to be assigned to the mobile station;

designating, if it is determined that QOF masking should be performed, the channel information indicating a Walsh code, out of 256 Walsh codes, to be used for a channel to be assigned to the mobile station, and designating the QOF index indicating a quasi-orthogonal function to be used for QOF masking;

filling in the remaining information fields of the connect message; and transmitting the connect message to the BSC.

6. The method as claimed in claim 1, wherein the step of generating the connect message comprises the steps of:

determining whether to perform QOF masking on the channel to be assigned to the mobile station;

designating, if it is determined that QOF masking should not be performed, the channel information indicating the Walsh code, out of 256 Walsh codes, to be used for a channel to be assigned to the mobile station, and setting the QOF index to '00';

filling in the remaining information fields of the connect message; and transmitting the connect message to the BSC.

7. The method as claimed in claim 1, wherein the connect message is an A3 interface message transmitted when a target base station initiates or adds one or more A3 interface user traffic connections to a SDU (Selection/Distribution Unit) of the source base station.

*8. A method for performing channel assignment in a base station for a mobile communication system, comprising the steps of:*

*transmitting, from a base station transceiver system (BTS) to a base station controller (BSC), a connect message upon receipt of a request for assigning a channel to a mobile station, said connect message including channel information indicating a Walsh code, out of 256 Walsh codes, to be used for a channel to be assigned to the mobile station, and a quasi-orthogonal function (QOF) index;*

*transmitting, from the BSC to the BTS, a connect ACK (acknowledge) message for acknowledging channel assignment-related information included in the connect message; and*

*assigning, in the BTS, a channel to the mobile station, said channel having been acknowledged by the BSC, upon receipt of the connect ACK message.*

*9. The method as claimed in claim 8, wherein four quasi-orthogonal functions are provided.*

*10. The method as claimed in claim 8, wherein the channel information is comprised of 8 or 11 bits.*

*11. The method as claimed in claim 8, wherein the connect message is an A3 interface message transmitted when a target base station initiates or adds one or more A3 interface user traffic connections to a SDU (Selection/Distribution Unit) of the source base station.*

*12. The method as claimed in claim 8, further comprising the steps of:*

*designating a frame selector (or channel type) in the connect message to indicate a supplemental code channel (SCCH) and designating a Walsh code with 6-bit channel information, if the channel to be assigned to the mobile station is a supplemental code channel (SCCH); and*

*ignoring overlapped information elements due to establishment of a fundamental channel in the connect message and filling in the remaining information fields in the connect message.*

*13. The method as claimed in claim 8, further comprising the steps of:*

*determining whether to perform QOF masking on the channel to be assigned to the mobile station;*

*designating, if it is determined that QOF masking should be performed, the channel information indicating a Walsh code, out of 256 Walsh codes, to be used for a channel to be assigned to the mobile station, and designating the QOF index indicating a quasi-orthogonal function to be used for QOF masking;*

*filling in the remaining information fields of the connect message; and transmitting the connect message to the BSC.*

*14. The method as claimed in claim 8, further comprising the steps of:*

*determining whether to perform QOF masking on the channel to be assigned to the mobile station;*

*designating, if it is determined that QOF masking should not be performed, the channel information indicating the Walsh code, out of 256 Walsh codes, to be used for a channel to be assigned to the mobile station, and setting the QOF index to '00';*

*filling in the remaining information fields of the connect message; and*

*transmitting the connect message to the BSC.*

*15. A apparatus for performing channel assignment in a base station for a mobile communication system, comprising:*

*a base station transceiver system (BTS) for transmitting a connect message upon receipt of a request for assigning a channel to a mobile station, said connect message including channel information indicating a Walsh code, out of 256 Walsh codes, to be used for a channel to be assigned to the mobile station, and a quasi-orthogonal function (QOF) index;*

*a base station controller (BSC) for receiving the connect message and transmitting to a connect ACK (acknowledge) message for acknowledging channel assignment-related information included in the connect message to the BTS;*

*wherein the BTS assigns the channel to the mobile station, said channel having been acknowledged by the BSC, upon receipt of the connect ACK message.*

*16. The apparatus as claim in claim 15, wherein four quasi-orthogonal functions are provided.*

*17. The apparatus as claim in claim 15, wherein the channel information is comprised of 8 or 11 bits.*

*18. The apparatus as claimed in claim 15, wherein the connect message is an A3 interface message transmitted when a target base station initiates or adds one or more A3 interface user traffic connections to a SDU (Selection/Distribution Unit) of the source base station.*

* * * * *